May 5, 1964   C. H. WIKLUND   3,131,826
MAGAZINE CONNECTOR
Filed March 9, 1962   2 Sheets-Sheet 2
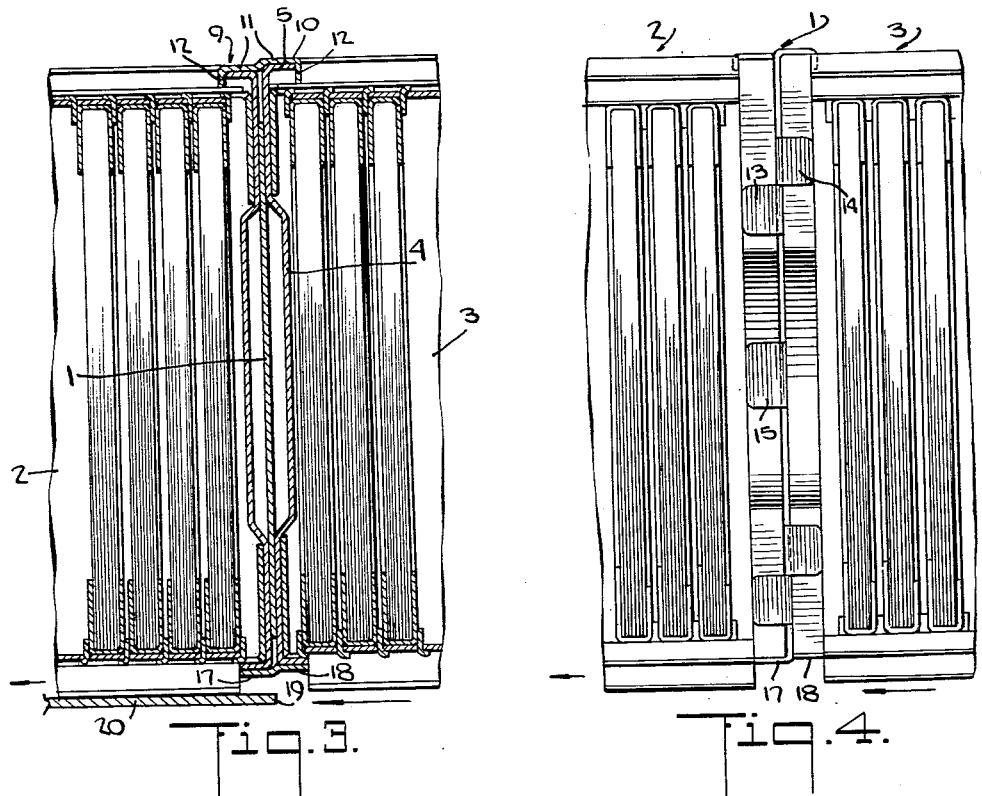
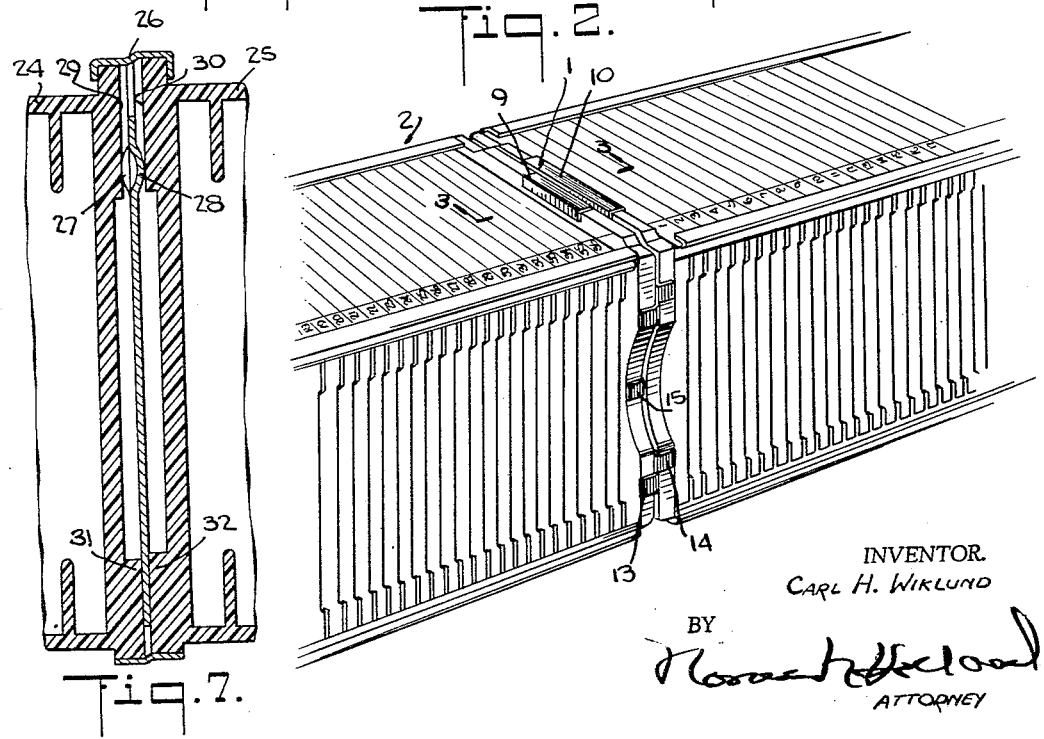
INVENTOR.
CARL H. WIKLUND
BY
ATTORNEY

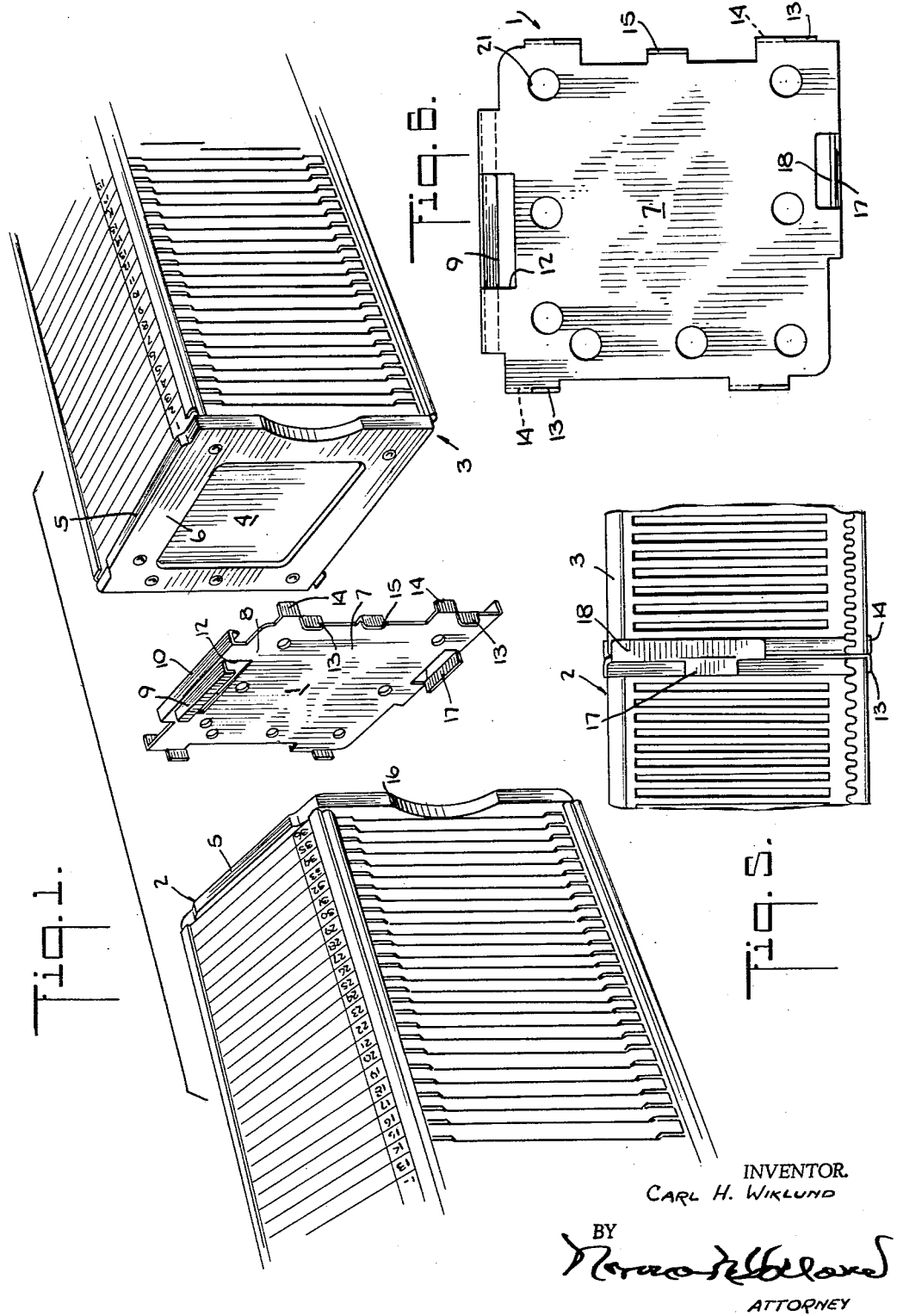

United States Patent Office 3,131,826
Patented May 5, 1964

3,131,826
MAGAZINE CONNECTOR
Carl H. Wiklund, New Rochelle, N.Y., assignor to Airequipt Manufacturing Co., Inc., New Rochelle, N.Y., a corporation of New York
Filed Mar. 9, 1962, Ser. No. 178,743
3 Claims. (Cl. 220—23.4)

The present invention relates to slide trays for automatic slide projectors and more particularly to a connector adapted to temporarily connect such slide trays together to facilitate continuous operation of a slide projector.

Automatic projectors using slide trays or magazines are widely used in exhibiting colored slides. A slide transfer means and magazines for use therewith are shown, for example, in my Patents Nos. 2,711,602; 2,837,851; and 2,915,840. Slide changers such as shown in these patents or other generally similar types have means for successively transferring individual slides from a magazine to a viewing position and for thereafter returning the slides to the magazine. For convenience of storage, the magazines have a limited length. This determines the number of slides which can be stored in a magazine which may be, for example, 36 slides as illustrated in the magazines shown in the above patents. No matter how many slides may be stored in the magazine, however, it is often desirable to show more slides in a particular sequence than can be stored in a single magazine and to have these slides shown in a continuous and uninterrupted sequence.

The coupling or connector of the present invention permits the magazines to be temporarily coupled together so that two or more such magazines may be handled as a unit. The connector also permits the magazines to be coupled together or added to one or more magazines already in position on a projector. The connector does not reduce the storage capacity of the magazines nor does it interfere with the operation of the slide changing mechanism.

Accordingly, an object of the present invention is to provide an improved temporary connector for slide magazines.

Another object of the present invention is to provide an improved magazine connector adapted for use with present magazines without requiring any alteration of the magazines.

Another object of the present invention is to provide a magazine connector permitting normal utilization and manipulation of the magazines.

Another object of the present invention is to provide a relatively simple yet effective magazine connector.

Another object of the present invention is to provide a connector for slide magazines permitting free movement of the magazines past the slide changing means.

Other and further objects of the invention will be obvious upon an understanding of the illustrative embodiment about to be described, or will be indicated in the appended claims, and various advantages not referred to herein will occur to one skilled in the art upon employment of the invention in practice.

A preferred embodiment of the invention has been chosen for purposes of illustration and description and is shown in the accompanying drawings, forming a part of the specification, wherein:

FIG. 1 is a exploded perspective illustrating a preferred embodiment of the connector intermediate two magazines before the connector is attached to the magazines;

FIG. 2 is a perspective view illustrating two magazines coupled together by the connector of FIG. 1;

FIG. 3 is a vertical sectional view through the connector and the ends of the connected magazines;

FIG. 4 is a side elevational view showing two magazines connected by the connector of FIG. 1;

FIG. 5 is a bottom plan view of two magazines in connected position;

FIG. 6 is a front elevational view of the preferred embodiment of the connector; and FIG. 7 is a vertical sectional view of another embodiment of the connector coupling a pair of plastic magazines together.

The connector 1 of the present invention is adapted to removably connect two magazines 2 and 3 such as illustrated in FIG. 1 and which have end plates 4 with a raised flange or rim 5 across their tops 6 and which have the remainder of the end plate with relatively flat edges adapted to receive suitable clip or flange members provided on the connector 1.

The preferred embodiment of the connector 1 comprises a center plate 7 cut or shaped with its upper portion 8 having back to back channel members 9 and 10. These channel members 9 and 10 have a horizontal portion 11 and a downwardly depending locking portion 12 both of which combine as best illustrated in FIG. 3 to engage the upstanding flange 5 on the adjacent magazine end plates 4. The connector 1 may be formed of thin gauge metal in which case the channel members 9 and 10 are formed by suitably cutting and bending the metallic plate. In this case, one or the other of the channel members such as channel 9 may be formed of material cut to form an aperture 12 in the plate 7. The connector 1 may be also molded of metal or plastic in which case the channels 9 and 10 are formed as integral projecting members in the molding operation.

Positioning tabs are provided extending in both directions on opposite sides of the connector 1. Thus, the tabs 13 are shaped and spaced to loosely engage the end plate 4 of the magazine 2 and the oppositely directed tabs 14 are shaped and spaced to loosely engage the end plate 4 of the adjacent magazine 3. The centrally positioned locking tab 15 is positioned inwardly of the adjacent tabs 13 so that it engages the recessed portion 16 of the end plate 4.

It is particularly important that the vertical position of the second or trailing magazine be slightly above the forward magazine which is passing through the slide changing mechanism to prevent the lower edge of the trailing magazine from striking the magazine guide plate. For this reason, channel member 10 is raised above channel member 9 and bottom flanges 17 and 18 are provided extending from opposite sides of the plates 7 as best illustrated in FIGS. 3 and 4 with flange 18 raised above flange 17 by an amount corresponding to the difference in height of channels 9 and 10. Thus channels 9 and 10 and cooperating flanges 17 and 18 fix the vertical position of the second magazine 3 in respect to the first magazine 2 and in the preferred embodiment hold the second or trailing magazine 3 slightly above the level of the magazine 2 to prevent the second magazine 3 from striking the end portion 19 of the projector or changer base plate 20 as the connected magazines 2 and 3 move forward through the slide changer. Apertures 21 are provided in the connector 1 at appropriate positions to accommodate rivet heads or other projections on the magazine end plates.

FIG. 7 illustrates another embodiment of the connector coupling two plastic magazines 24 and 25 together. This connector 26 is generally similar to the above described connector 1 but it includes in addition projecting spacing members 27 and 28. These spacing members are provided to accommodate end portions 29 and 30 of the magazines 24 and 25 which are offset with respect to the lower end portions 31 and 32 which engage the bottom of the connector 26. Thus, as illustrated in FIG. 7, the upper portion 29 of the magazine end plate 33 is spaced inwardly from the lower end portion 31. The spacing members 27 and 28 are provided to properly align the magazine 25 and 26 after they are coupled together by the connector 26. These spacers 27 and 28 may be conveniently provided by forming indentations in the body of the connector where metal connectors are used and they may be formed during the molding operation in the event that the connectors are made of plastic.

It will be seen that a connector in accordance with this invention will tightly connect the magazines while at the same time permitting them to pass through the slide changing apparatus without interference. It will also be seen that no portion of the connector enters into the compartments provided for the slides so that full utilization is made of the interconnected magazines.

The connectors are easily applied to the magazines either before the magazines are placed in the projector or after one or more of the magazines are positioned on the changer base plate. The lowermost channel of the connector is slipped over the raised end flange on the leading magazine and the side tabs and the bottom flange of the connector are slipped into position on the magazine end plate. Thereafter the second magazine is attached by slipping its raised flange under the empty top channel on the connector and the magazine is swung downwardly causing the side locking tabs and the bottom flange to engage the magazine end plate. It thus can be seen that a connector can be placed on a magazine already resting on the projector base plate and the second magazine can thereafter be attached to the connector by tilting the rear end of the magazine slightly upwardly so that its raised end flange can be moved under the connector top channel. Now, when the magazine is again leveled, the side tabs and the bottom flange will move into position on the magazine end plate. After one magazine has passed the slide injection lever, it may be removed from the trailing magazine without interfering with the trailing magazine by lifting its forward end and by then slipping the raised end flange on the magazine out from under the top channel of the connector.

This connector is seen to be particularly useful as it in no way interferes with normal projector operation and may be quickly and easily applied to connect magazines in the above described manner either before the magazines are placed in position on the projector or may be used to add additional magazines to one or more magazines already in the projector. The connector also permits easy release and removal of those magazines which have already passed the slide changing lever without interfering with the magazines in projection position.

As various changes may be made in the form, construction and arrangement of the parts herein without departing from the spirit and scope of the invention and without sacrificing any of its advantages, it is to be understood that all matter herein is to be interpreted as illustrative and not in a limiting sense.

Having thus described my invention, I claim:

1. A connector for removably coupling slide magazines having raised flanges at one side of each magazine end plate comprising the combination of a relatively flat plate having top and bottom edges generally parallel to one another along at least a portion of their length, a channel member on each of the opposite sides of the top edge of said plate with the open sides of the channels facing the bottom edge of the plate and adapted to receive the raised flanges on the magazine end plates, spaced flat tabs extending generally perpendicularly to said plate and in opposite directions from a pair of edges between said top edge and said bottom edge and being adapted to position the magazine ends, and a pair of generally flat flanges at said bottom edge extending generally perpendicularly to the plate from both faces of the plate to hold the raised flanges on the magazines in said channels.

2. The connector as claimed in claim 1 which further comprises spacing members extending outwardly from both sides of said plate to engage and position portions of the ends of the magazines.

3. A connector for removably coupling slide magazines having raised flanges at one side of each magazine end plate comprising the combination of a relatively flat and generally rectangular plate, a channel member on each of the opposite sides of one edge of said plate with the open sides of the channels facing the opposite edge of the plate from said one edge and adapted to receive the raised flanges on the magazine end plates, the bottom of one channel being spaced further from said opposite edge of said plate than the bottom of the other channel, spaced tabs extending generally perpendicularly to said plate and in opposite directions from the pair of edges between said one edge and said opposite edge and being adapted to locate the magazine ends, a pair of flanges at said opposite edge extending generally perpendicularly to the plate from both faces of the plate to hold the raised flanges on the magazine in said channels, and the flange on one side of said plate being spaced the same distance from the bottom of said channel on that side as the other of said flanges is spaced from the bottom of the other channel.

References Cited in the file of this patent
UNITED STATES PATENTS

| | | |
|---|---|---|
| 1,519,901 | Boaz | Dec. 16, 1924 |
| 2,090,477 | Graham | Aug. 17, 1937 |
| 2,865,121 | Anderton | Dec. 23, 1958 |